R. L. MOSSMAN.
CALIPERS.
APPLICATION FILED AUG. 9, 1916.

1,225,475.

Patented May 8, 1917.

WITNESSES
Edw. Thorpe,
C. Bradway.

INVENTOR
R. L. Mossman
BY
ATTORNEYS

UNITED STATES PATENT OFFICE.

ROY LYNN MOSSMAN, OF HUMBOLDT, TENNESSEE.

CALIPERS.

1,225,475.   Specification of Letters Patent.   Patented May 8, 1917.

Application filed August 9, 1916. Serial No. 113,863.

*To all whom it may concern:*

Be it known that I, ROY L. MOSSMAN, a citizen of the United States, and a resident of Humboldt, in the county of Gibson and State of Tennessee, have invented new and Improved Calipers, of which the following is a full, clear, and exact description.

This invention relates to calipers of special construction, whereby it is possible to readily ascertain the minimum diameter of circular stock material from which pieces of even-sided polygonal cross-section can be made.

The invention has for its general objects to provide a caliper which is of comparatively simple and inexpensive construction, easy to use, and adaptable for special or ordinary use.

In carrying out the invention the members of the caliper are provided with suitably arranged cusps on the longitudinal opposed faces, which cusps are so designed that the outermost or terminal cusps will give the diameter of a circular piece of material from which an even-sided polygonal object can be made, the diameter of which is determined by any of the other opposed cusps lying inwardly from the terminal cusps. For instance, when the caliper members are adjusted so that the cusps used for determining a square piece are the right distance apart, the terminal cusps will give the minimum diameter of the circular stock from which a square piece can be made. The other cusps are used the same way for hexagons, octagons, etc.

For a more complete understanding of the invention reference is to be had to the following description and claim taken in connection with the accompanying drawing, wherein similar characters of reference indicate corresponding parts in all the views, and wherein—

Figure 1:
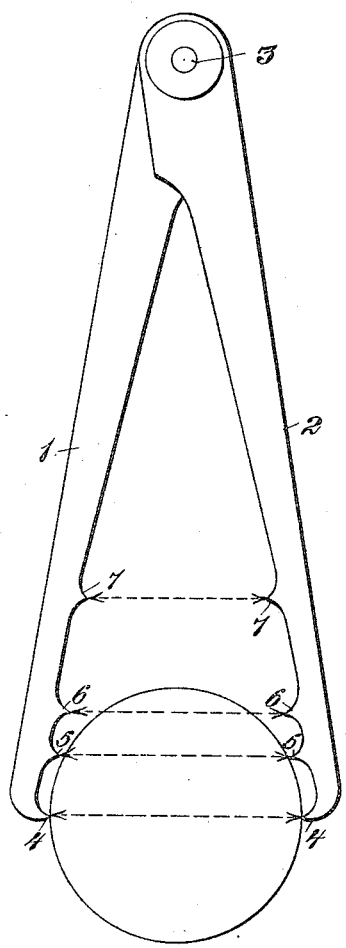
Figure 1 is a side view of the caliper.

Referring to the drawing, 1 and 2 designate the members of the caliper, which members are hingedly connected in the usual manner at 3. On the longitudinal edge of each member are cusps or points 4, 5, 6 and 7 so arranged that when the caliper is closed the points on one member will meet the corresponding points on the other member. These cusps are so disposed with respect to the outermost cusps 4 that when the caliper is opened to a given distance it is possible to determine the diameter of an octagon, hexagon or square by the distances between the opposed points 5, 6 or 7 of the two caliper members. If it is desired to lay out a square from circular stock the calipers are adjusted to bring the points 7 the right distance apart, and in doing this the terminal points 4 will give the minimum diameter of a circle from which this square can be laid out.

Figure 2:
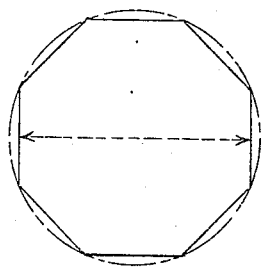
Figs. 2, 3 and 4 are diagrammatic views showing the sizes of octagonal, hexagonal and square objects which can be laid out within a circle, the diameter of which is equal to the distance between the terminal cusps of the caliper when adjusted as in Fig. 1.
Figure 4:
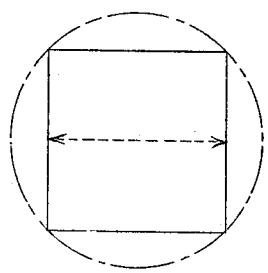
Figure 3:
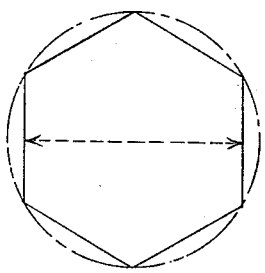

By using the tips 4 of the caliper to measure a piece of circular cross-section, as shown in Fig. 1, the various points 5, 6 and 7 will give the diameters from which objects of octagonal, hexagonal and square shape may be obtained, as shown in Figs. 2, 3 and 4, and this without changing the adjustment of the caliper members and simply measuring the distances between the points 5—5, 6—6 and 7—7. The caliper members can be adjusted so that the cusps will lie on the outside for making internal measurements.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

An instrument of the class described comprising hingedly connected caliper members, and a series of cusps on complementary lateral edges of the members, the cusps on one member being arranged to register with the cusps on the other, the outermost cusp of the members being so related to the other cusps that the distance between the outermost cusps will give the diameter of a circle from which even-sided polygons of the same diagonal dimension and having diameters equal to the distances between the other registering cusps, can be obtained.

ROY LYNN MOSSMAN.

Copies of this patent may be obtained for five cents each, by addressing the "Commissioner of Patents, Washington, D. C."